June 11, 1940.　　　　　L. S. HAMER　　　　　2,203,989
VALVE DEVICE
Filed Dec. 27, 1937　　　5 Sheets-Sheet 1

Inventor
LELAND S. HAMER
By
His Attorney

June 11, 1940.   L. S. HAMER   2,203,989
VALVE DEVICE
Filed Dec. 27, 1937   5 Sheets-Sheet 3

Inventor
LELAND S. HAMER
By
His Attorney

June 11, 1940.  L. S. HAMER  2,203,989
VALVE DEVICE
Filed Dec. 27, 1937   5 Sheets-Sheet 5

Inventor
LELAND S. HAMER
By
His Attorney

Patented June 11, 1940

2,203,989

UNITED STATES PATENT OFFICE 2,203,989

VALVE DEVICE

Leland S. Hamer, Long Beach, Calif., assignor of one-fourth to Paul A. Dewhirst, Los Angeles, Calif.

Application December 27, 1937, Serial No. 181,797

7 Claims. (Cl. 251—167)

This invention relates to fluid handling devices and relates more particularly to a valve device or line blind for closing off flow through a pipe line. A general object of this invention is to provide a valve device useful as a line blind, a gate valve and an orifice meter fitting that is simple and inexpensive to manufacture and that is positive in action.

In pipe lines where it is necessary to cut off the flow for substantial periods it has been the general practice to provide two spaced adjacent gate valves and a pair of flanged fittings between the gate valves to receive a disc or "blind" for shutting off the line. When it becomes necessary to suspend the use of the line or to completely cut off the flow through the line to permit the replacement of valves, the repair of equipment, etc., the gate valves are closed and the "blind" is bolted between the flanged fittings to fully shut off the fluid flow. During the installation of the disc or "blind" there is a certain leakage or loss of the fluid and in instances where the fluid is inflammable, a dangerous fire hazard is created. The two gate valves and the flanged fittings required in a typical blind installation are very expensive and the assembly of the two valves and the blind fittings requires substantial space.

Another object of this invention is to provide a simple, compact valve device that may be employed as a blind to fully and dependably close off a pipe line. The valve device provided by the present invention is much cheaper to manufacture and install than the sets of gate valves and flange fittings heretofore required at a blind installation and is capable of maintaining a complete shut-off without leakage for an indefinite period.

Another object of this invention is to provide a valve device of the character mentioned that may be quickly operated to the fully closed position without the loss or leakage of fluid and without manipulating bolts, flanges or the like.

Another object of this invention is to provide a valve device of the character mentioned that is small and compact and that requires a minimum of space for its installation.

Another object of this invention is to provide a valve device of the character mentioned that embodies novel and particularly effective packing means assuring a positive seal about the "blind" or valve disc.

Another object of this invention is to provide a valve device of the character mentioned that is capable of resisting high pressures for an indefinite period.

Another object of this invention is to provide a valve device of the character mentioned that embodies a particularly effective and rapid means for actuating the packing means when the "blind" or valve plate is either in the closed or fully open position.

A further object of this invention is to provide a valve device of the character mentioned in which the "blind" plate may be replaced by an orifice plate or vice versa, without shutting down the line and without the loss of fluid.

The various objects and features of my invention will be fully understood from the following detailed description of typical preferred forms and applications of the invention, throughout which description reference is made to the accompanying drawings, in which:

The embodiment of my invention illustrated in Figs. 1–11, inclusive, of the drawings, may be said to comprise, generally, the following elements: A body 10 to be connected in a pipe line L, a plate 11 in the body 10, means 12 for moving the plate 11 into and out of a position where it closes off flow through the line L, sealing means 13 for sealing about the plate 11 and for closing off the space occupied by the plate when the same is in the out position and means 14 for actuating and controlling the sealing means 13.

The body 10 carries and contains the various other elements of the valve device and is intended to be connected or interposed in the pipe line L or the like. The body 10 is preferably sectional and in the form of the invention being described comprises two main sections, A and B, and a head C. The section A is provided with means for facilitating its connection with the line L. In the particular case illustrated the body section A has a flange 15, at what may be termed its outer end, connected with a flange 16 of the line L by bolts 17. An opening 18 is provided in the body section A to register with the fluid handling interior of the line L. The section A is further provided with a chamber 19. The chamber 19 joins the inner end of the opening 18 and extends both upwardly and downwardly as well as laterally from the inner end of the opening 18. A raised seat or surface 20 is provided on the interior of the body section A surrounding the inner end of the opening 18 where it joins the chamber 19.

The body section A is shaped so that the chamber 19 has what may be termed a channel 21 for receiving and guiding the plate 11 as will be more fully described. The channel 21 has a side wall and spaced parallel end walls and extends outwardly or laterally at right angles to the longitudinal axis of the opening 18. A tapped opening 22 is provided in the lower end of the section A to communicate with the chamber 19 and is normally closed by a drain plug 23. The drain plug 23 may have a threaded test plug 24. A flange 25 is provided on the end of the section A remote from the flange 15.

The body section B is provided with a flange 26 connected with the flange 25 by bolts 27. The section B extends across what may be termed the mouth of the chamber 19 to close the same and is shaped so that its interior forms an extension or continuation of the chamber. Means is provided on the section B for facilitating its connection with the pipe line L. In the case illustrated a flange 28 is provided on the section B and bolts 29 connect the flange 28 with a flange 30 of the line. An opening 31 extends through the flange 28 in axial alignment with the above described opening 18 and registers with that portion of the line L carrying the flange 30. In accordance with the invention the section B has a part 32 extending from its end or side wall through the chamber 19 toward the surface 20. The part 32 has a cylindrical exterior and the opening 31 extends longitudinally through it so that the part is tubular. The inner end of the part 32 is in spaced parallel relation with the surface 20.

The head C of the body 10 is provided on the section A to carry the plate operating or moving means 12 as will be hereinafter described. In practice the head C is arranged on the upper end of the section A and is removably secured thereto by screws 33. The head C is chambered or partially hollow and its interior forms an upper continuation of the channel 21.

Figure 1:
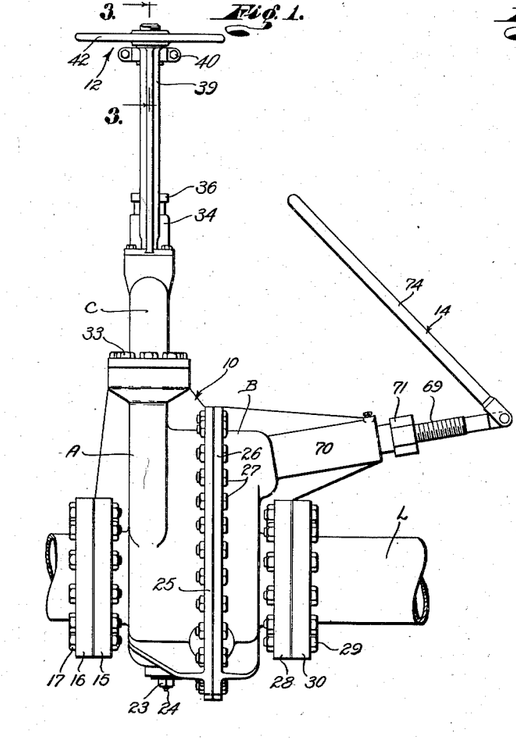
Fig. 1 is a side elevation of a typical embodiment of the invention.
Figure 2:
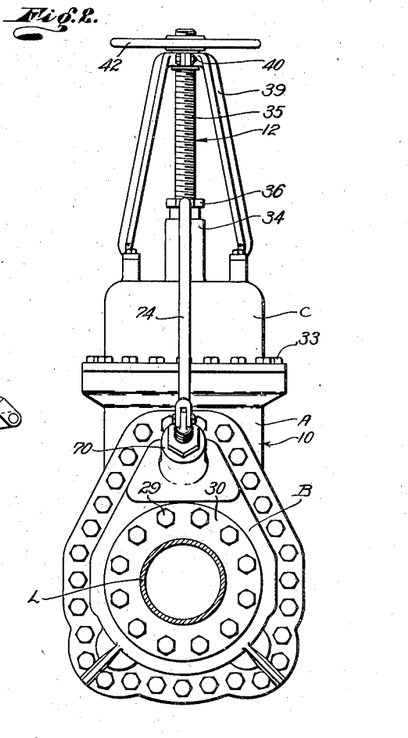
Fig. 2 is an end view of the device shown in Fig. 1.
Figure 3:
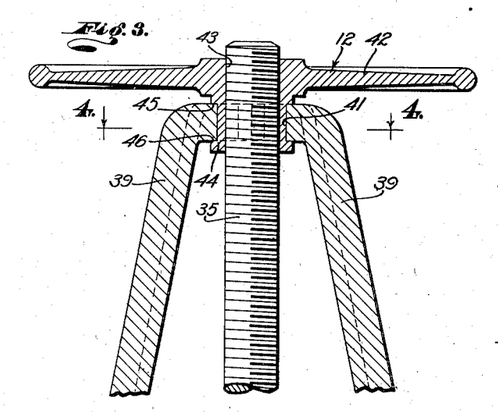
Fig. 3 is an enlarged fragmentary vertical detailed sectional view taken as indicated by line 3—3 on Fig. 1.
Figure 4:
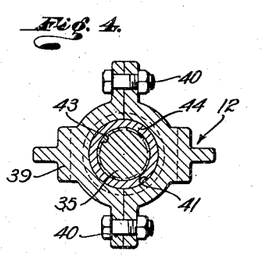
Fig. 4 is a horizontal detailed sectional view taken as indicated by line 4—4 on Fig. 3.
Figures 5, 6, 11:
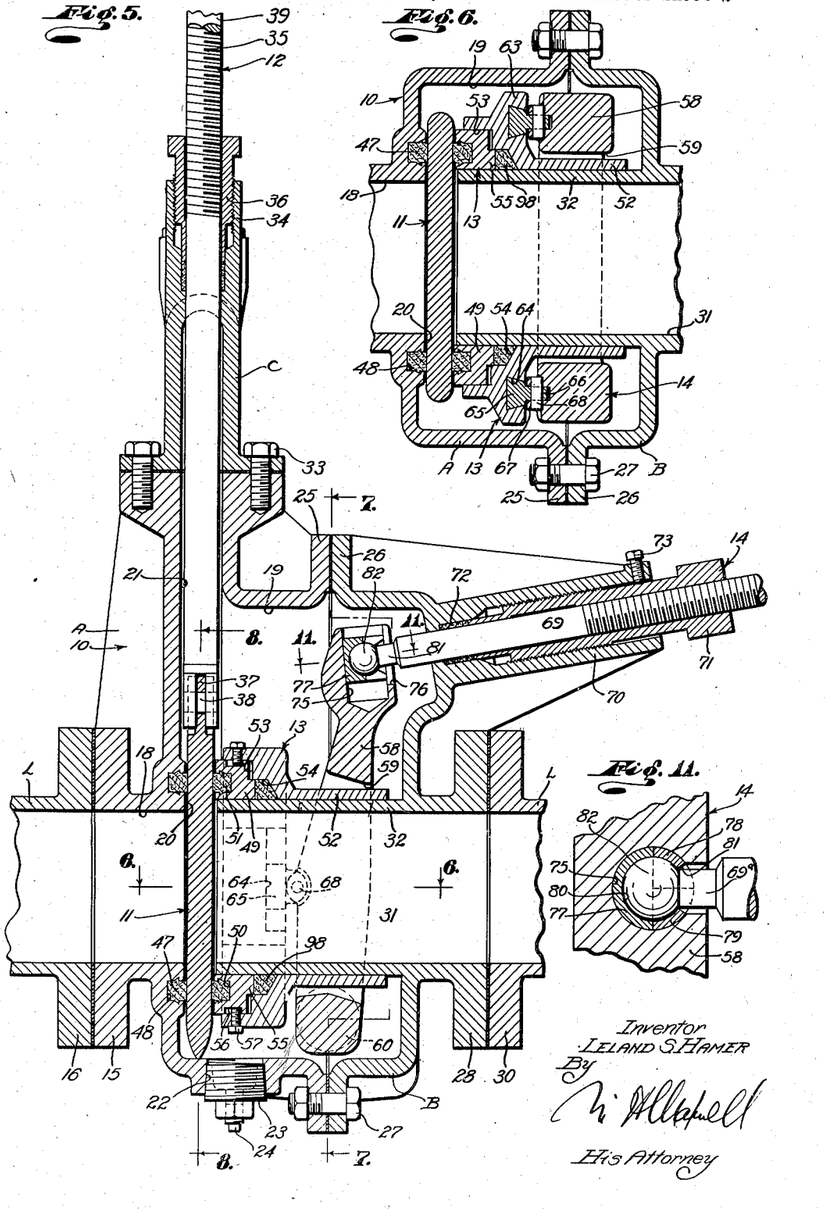
Fig. 5 is an enlarged vertical detailed sectional view of the device shown in Fig. 1 with the blind plate in the closed position, the manual operating parts being broken away.
Fig. 6 is a fragmentary horizontal detailed sectional view taken as indicated by line 6—6 on Fig. 5.
Fig. 11 is an enlarged fragmentary detailed sectional view taken as indicated by line 11—11 on Fig. 5.
Figure 7:
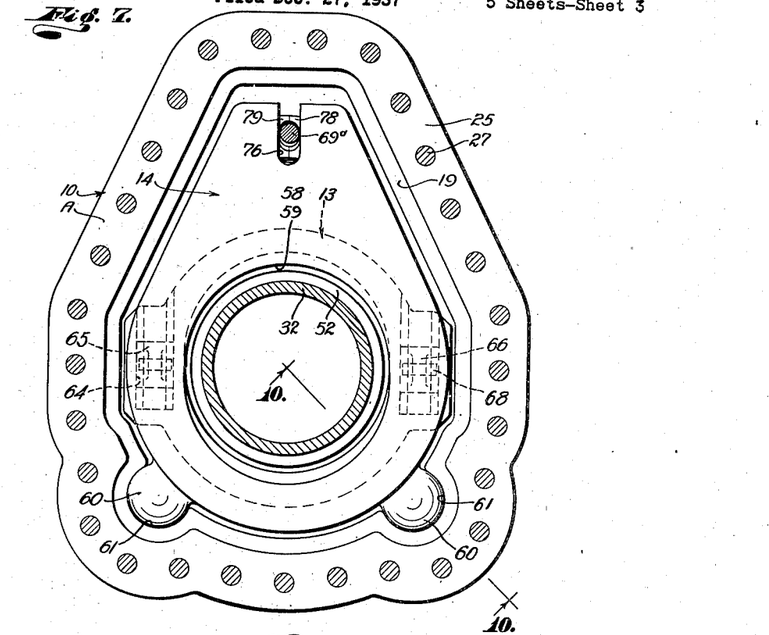
Fig. 7 is a vertical detailed sectional view taken as indicated by line 7—7 on Fig. 5.
Figures 8, 8A:
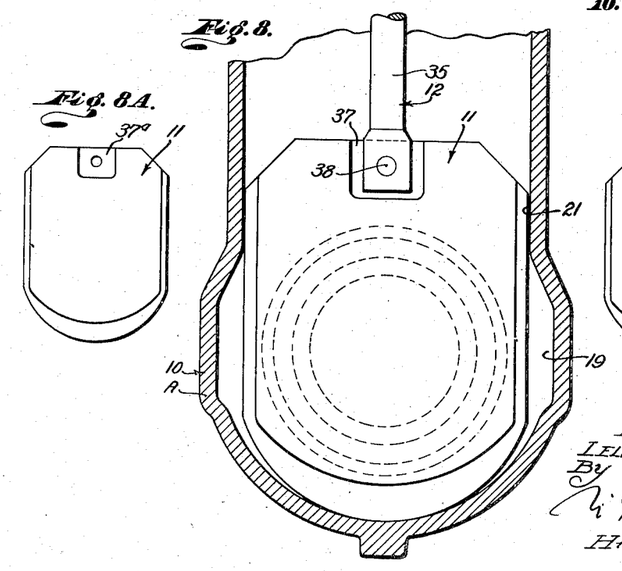
Fig. 8 is a fragmentary vertical detailed sectional view taken as indicated by line 8—8 on Fig. 5.
Fig. 8A is a reduced side elevation of the blind plate removed from the valve structure.
Figure 8B:
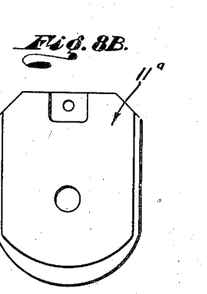
Fig. 8B is a reduced side elevation of an orifice plate that may be used in the valve structure.
Figures 9, 10:
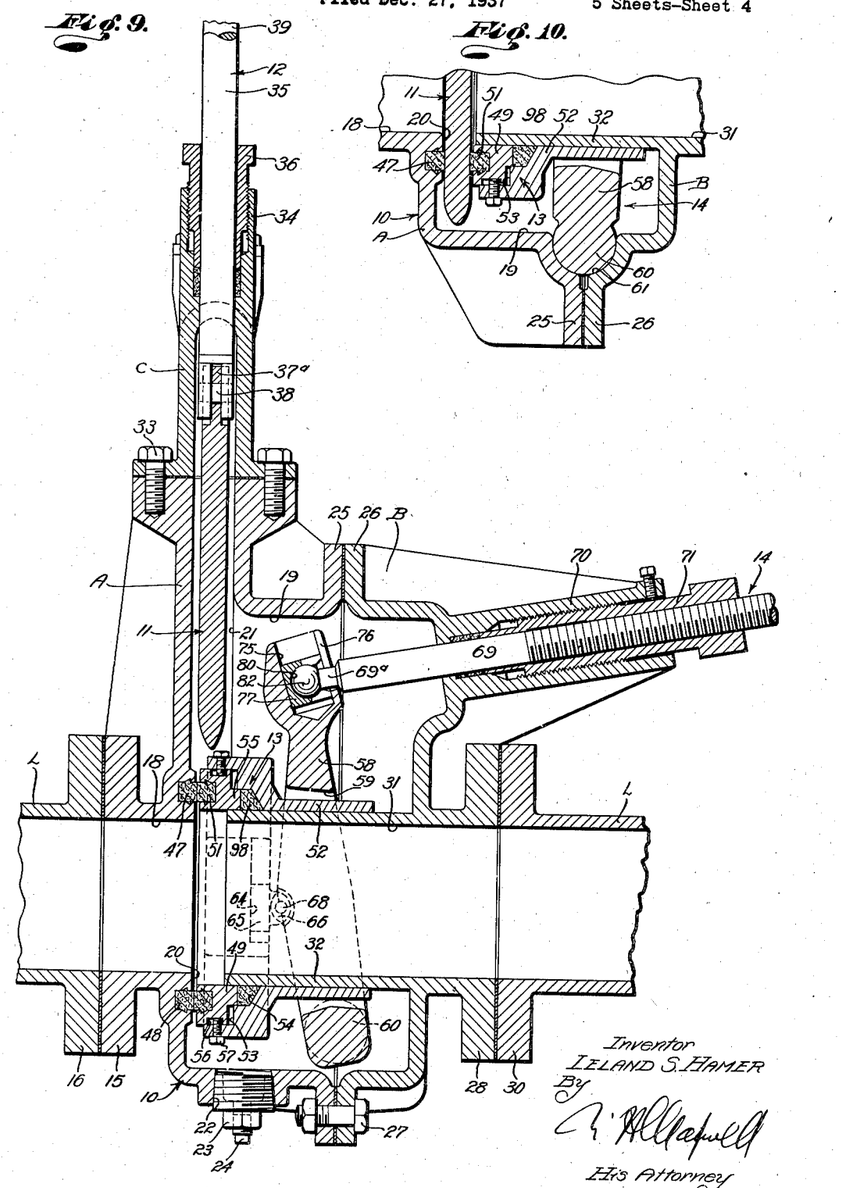
Fig. 9 is a view similar to Fig. 5, showing the blind plate in its open or inoperative position and showing the packing means sealing off the plate channel from the fluid passage.
Fig. 10 is a fragmentary detailed sectional view taken as indicated by line 10—10 on Fig. 7.

The plate 11 is arranged in the body 10 and is movable by the means 12 between a position where it extends across and closes the fluid passage formed by the openings 18 and 31 and a position clear of said passage. In accordance with the invention the plate 11 may be in the nature of an imperforate gate or blind, as shown in Fig. 8A, or may be in the nature of a perforated plate or orifice plate designated 11a in Fig. 8B, useful in the metering of fluid. Where I hereinafter refer to the plate 11 it is to be understood that the orifice plate 11a may in each instance be substituted for the blind plate 11. Further, it is a feature of the invention that an orifice plate having an orifice of the desired size may be substituted for the plate 11 at any time and vice versa, without shutting down the line L and without the loss or leakage of fluid.

The plate 11 preferably has flat parallel sides and its opposite side edges are preferably vertical and rounded, as illustrated in the drawings. The lower edge of the plate 11 may be curved to be received in the correspondingly shaped lower end of the channel 21 and the corners of the lower edge are preferably bevelled off or rounded to readily pass the elements of the sealing means 13 and to assist in guiding the plate as will be more fully described. The upper edge of the plate 11 is preferably flat and horizontal and the upper corners of the plate may be bevelled off. The plate 11 is proportioned to readily move longitudinally through the channel 21 and when its lower edge rests on the bottom wall of the channel 21 or the chamber 19 the plate overlaps or projects beyond the surface 20 and the inner end of the part 32 in all directions to fully close off the fluid passage formed by the openings 18 and 31. The orifice plate 11a referred to above preferably has the same shape and proportions as the blind plate 11.

In the embodiment of the invention illustrated in Figs. 1 to 11 inclusive, of the drawings, the means 12 for operating or moving the plate 11 is in the nature of a screw means. The upper end of the body head C has a projecting boss 34 and the means 12 includes a stem 35 extending through the boss into the channel 21. A packing gland 36 is provided on the boss 34 to seal about the stem 35. The inner end portion of the stem 35 is yoked to receive a portion 37a of the plate 11 that is reduced in thickness. A pin 38 is arranged through openings in the yoked portion of the stem 35 of the thin plate portion 37a to pivotally connect the plate 11 with the stem 35. The pin 38 is removable so that upon removal of the head C the plate 11 may be withdrawn from the body 10 and disconnected from the stem 35. Upwardly converging arms 39 are secured to the upper end of the head C and their upper end portions are connected by flange and bolt connections 40. The portion of the stem 35 projecting upwardly beyond the packing gland 36 is threaded and the stem extends upwardly through an opening 41 in the connected upper portions of the arms 39. A hand wheel 42 is provided to operate the stem 35. The hand wheel 42 has an opening 43 receiving the stem 35 and is provided with a thread mating with the thread of the stem. A boss 44 on the hand wheel 42 is rotatable in the opening 41 and has shouldered engagement at 45 and 46 with the arms 39 at the upper and lower ends of the opening 41. It will be apparent how rotation of the wheel 42 produces movement or translation of the stem 35 and the plate 11 connected therewith. The screw actuated stem 35 is adapted to move the plate 11 between the positions illustrated in Figs. 5 and 9 of the drawings.

The sealing means 13 is an important feature of the invention and is operable by the means 14 to pack against the opposite sides of the plate 11 when the same is in the closed position and is operable by the means 14 to completely close off the space between the surface 20 and the inner end of the part 32 when the plate 11 is in its opened or inoperative position. The sealing means 13 includes a stationary packing unit for sealing with one side of the plate 11 and a movable packing unit for sealing with the other side of the plate and for sealing with the stationary unit. The stationary unit of the sealing means 13 comprises a ring 47 of packing material arranged in an annular groove 48 in the surface 20. The packing ring 47 surrounds and is spaced from the inner end of the opening 18 and is concentric with the opening. The ring 47 protrudes beyond the surface 20 and preferably has a flat outer surface.

The above mentioned movable unit of the means 13 includes a ring 49 slidable or shiftable axially on the part 32. The ring 49 surrounds the inner portion of the part 32 and has a flat end opposing and parallel with the surface 20. An annular groove 50 is provided in said end of the ring 49 in opposing concentric relation to the groove 48. A ring 51 of packing material is set in the groove 50. The ring 51 protrudes beyond the end surface of the ring 49 and is adapted to seal against a side surface of the plate 11 when the plate is in its closed position and is adapted to seal against the ring 47 when the plate is in its raised or inoperative position.

The sealing means 13 further includes a sleeve 52 slidable or shiftable longitudinally on the part 32. The forward or inner portion of the sleeve 52 is enlarged in external diameter and has an annular socket 53 shiftably receiving the ring 49. A groove 54 is provided in the bottom or inner wall of the socket 53 and the ring 49 has an annular flange 55 adapted to enter the mouth of the groove 54. The inner or bottom wall of the groove 54 preferably slopes rearwardly to join the longitudinal opening of the sleeve 52. The ring 49 and the sleeve 52 are slackly connected whereby the ring is moved by or with the sleeve. In the structure illustrated, sockets or grooves 56 are provided in the periphery of the ring 49 and the sleeve 52 has screws 57 projecting into the grooves. The screws 57 have limited longitudinal movement in the grooves 56. The sealing means 13 embodies a body or ring 98 of packing material occupying the groove 54 to seal with the periphery of the part 32. The packing ring 98 is adapted to be compressed by the flange 55 of the ring 49 and is operable to seal with the flange 55, the periphery of the part 32 and the walls of the groove 54 to prevent leakage between the ring and the sleeve 52 and between the part 32 and the assembly of the ring 49 and the sleeve 52.

The means 14 is provided to actuate the sealing means 13 and is manually operable from the exterior of the body 10 to move the assembly of the ring 49 and the sleeve 52 along the part 32. The means 14 includes what I will term a yoke 58 supported for pivotal movement in the chamber 19 and operatively connected with the sleeve 52. The yoke 58 may be a plate-like member having an opening 59 freely receiving the sleeve 52. The means for pivotally or swingably supporting the yoke 58 in the body 10 comprises two spaced generally spherical projections 60 on the lower end of the yoke 58 received in correspondingly shaped pockets 61 in the lower wall of the body 10. The pockets 61 have substantially equal portions in the body sections A and B at the plane of the adjoiner of the sections. This provides for the easy assembly of the projections 60 in the pockets 61 at the time of the assembly of the body 10. The location and character of the projections 60 and the pockets 61 are such that the yoke 58 may pivot about a horizontal axis spaced below the sleeve 52.

Movement transmitting connections are provided between the yoke 58 and the sleeve 52. These connections may include diametrically opposite wings 63 on the enlarged portion of the sleeve 52. The wings 63 are provided with vertical dovetailed slots 64 carrying correspondingly shaped shiftable blocks 65. Tongues 66 are provided on the blocks 65 and are received between spaced fingers 67 on the yoke 58. Pivot pins 68 are arranged through openings in the tongues 66 and the fingers 67 to pivotally connect the blocks 65 with the yoke 58. It is believed that it will be apparent how the blocks 65 pivotally connected with the yoke 58 and shiftable in the dovetailed slots 65 operate to transmit movement between the yoke and the sleeve 52 so that the sleeve is shifted longitudinally on the part 32 when the yoke is pivoted.

The means 14 further includes an operating stem or shaft 69 for moving or pivoting the yoke 58. An axially extending tubular boss 70 is provided on the outer side of the body section B and the shaft 69 passes longitudinally through the boss to extend into the chamber 19. The boss 70 preferably projects upwardly and longitudinally as illustrated in the drawings. A gland 71 is threaded in the boss 70 to compress packing 72 which seals about the shaft 69. The shaft 69 and the gland 71 have cooperating threads so that rotation of the shaft results in longitudinal movement of the shaft. A set screw 73 on the boss 70 may lock the gland 71 against rotation. An operating handle or rod 74 is pivotally connected with the outer end of the shaft 69 to facilitate the manipulation or rotation of the shaft.

The inner end of the operating shaft 69 is connected with the yoke 58. A bore or opening 75 is provided in the upper end of the yoke 58 and a slot 76 communicates with the opening. A split or sectional block is shiftable longitudinally in the opening 75. This block is divided in a vertical or longitudinal diametric plane to have an inner section 77 and an outer section. The said outer section is in turn divided in a radial plane into two sections, 78 and 79. A spherical socket 80 is formed in the block sections 77, 78 and 79 in concentric relation to the point of intersection of the planes of division of the block. An opening 81 is formed in the block sections 78 and 79 to register with the slot 76. The shaft 69 has a reduced portion 69ª extending through the slot 76 and the opening 81 and a spherical ball 82 is provided on the outer end of this portion to occupy the socket 80. The ball 82 is free to turn in the socket 80. The split block comprising the sections 77, 78 and 79 is easily assembled about the ball 82 and then inserted in the opening 76, the slot 76 receiving the reduced shank portion 69ª so that the shaft does not interfere with the introduction of the block in the opening. Upon rotation of the shaft 69 the shaft moves axially or longitudinally and the ball 82 cooperating with the socket 80 transmits this axial movement to the yoke 58 to pivot the yoke.

It is believed that the operation of the form of valve device illustrated in Figs. 1 to 11 inclusive, of the drawings, will be readily understood from the foregoing detailed description. It may be assumed that the parts are in the positions illustrated in Fig. 9 of the drawings where the plate 11 is in the outer portion of the channel 21. When the plate is in this position the ring 49 extends across or bridges the space between the surface 20 and the inner end of the part 32. The shaft 69 may have been threaded inwardly to swing the yoke 58 toward the channel 21 to force the ring 51 into tight sealing engagement with the ring 47. This actuation of the sleeve 52 also compresses the packing ring 98. From this it will be seen that the packing ring 98 dependably prevents the leakage of fluid around the part 32 and from between the ring 49 and the sleeve 52. It is to be observed that when the parts are in the positions illustrated in Fig. 9 as just described, that the head C may be removed from the body 10 to permit the withdrawal and replacement of the plate 11. Upon the disconnection of the head C from the body 10 the plate 11 is freely accessible and, if desired, may be replaced by an orifice plate. The removal of the head C and the replacement of the plate 11 may be effected without the loss or leakage of fluid from the line L. If desired or believed necessary the fluid that may be within the chamber 19 may be drained off by means of the plug 23 or the plug 24 prior to the removal of the head C. With the head C in place on the body 10 the valve device may be tested from time to time by removing the plug 24 to determine if fluid is collecting in the chamber 19. In the event that liquid is collecting in the chamber 19 the shaft 69 may be tightened or threaded inwardly to more tightly force the packing ring 51 against the ring 47 and to more tightly compress the packing ring 98.

When it is desired to close off the line L the shaft 69 is threaded outwardly to move the assembly of the sleeve 52 and the ring 49 away from the surface 20 and the ring 47. Simultaneously with or following the outward threading of the shaft 69 the hand wheel 42 may be rotated to lower the plate 11. The plate may be lowered or moved downwardly between the packing rings 47 and 51 to assume the position illustrated in Fig. 5 of the drawings. When the plate 11 reaches this position the shaft 69 may be threaded inwardly to pivot the yoke 58 in toward the plate 11 and thus moves the assembly of the ring 49 and the sleeve 52 toward the plate. This brings the packing ring 51 into sealing engagement with one side of the plate 11 and the ring 51 pressing against the plate urges the opposite side of the plate 11 into sealing engagement with the ring 47. Thus a tight, dependable seal is provided at both sides of the plate 11 around the fluid passage defined by the openings 18 and 31. The above mentioned inward threading of the shaft 69 also results in shifting of the sleeve 52 relative to the ring 49 and this relative movement compresses or actuates the packing ring 98 which dependably seals about the part 32 and seals between the relatively shiftable ring 49 and sleeve 52. Thus the device is operable to maintain a fluid tight seal about the plate 11 and to dependably resist both up-stream and down-stream fluid pressures on the plate and the packing means.

To open the valve device it is only necessary to back off or thread outwardly the shaft 69 to relieve the sealing pressures from the plate 11 and then rotate the hand wheel 42 to move the plate 11 outwardly in the channel 21. When the plate 11 has been brought to the position illustrated in Fig. 9 of the drawings the shaft 69 may be threaded inwardly to bring the packing ring 51 into engagement with the ring 47 to completely seal off the line pressures from the chamber 19 as described above.

Figures 12, 13, 14:
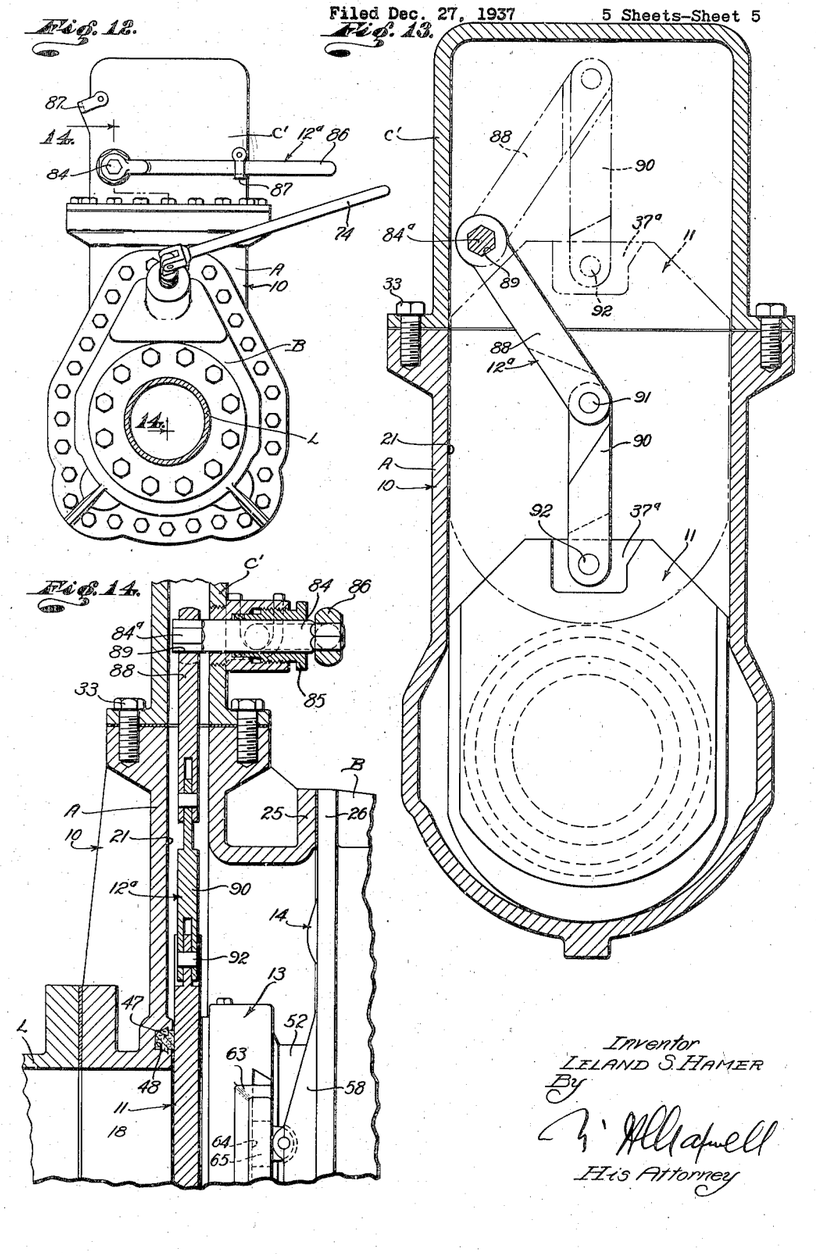
Fig. 12 is an end view of another embodiment of the invention.
Fig. 13 is an enlarged vertical detailed sectional view of the device shown in Fig. 12
Fig. 14 is an enlarged fragmentary vertical detailed sectional view taken as indicated by line 14—14 on Fig. 12.

Figs. 12, 13 and 14 of the drawings illustrate a form of the invention embodying a lever means 12ª for operating or shifting the plate 11. The body sections A and B, the plate 11, the sealing means 13 and the means 14 of this form of the invention may be identical with the corresponding elements of the previously described embodiment. The head C' of the body 10 may be similar to the above described head C but does not include the boss 34, the arms 39, etc.

The means 12ª for operating or shifting the plate 11 includes a shaft 84 extending through a gland 85 on a side of the head C'. The shaft 84 is rotatable about a substantially horizontal axis offset from the central vertical axis of the head C' and the channel 21. A suitable handle 86 is fixed to the outer end portion of the shaft 84 to facilitate its operation. Stops 87 are provided on the head C' to limit turning of the handle 86 and to support the handle in its two extreme positions. The inner end portion 84ª of the shaft 84 is polygonal. The means 12ª further includes a lever 88 connected to the shaft 84. The lever 88 has a polygonal opening 89 in its upper end part receiving the polygonal shaft portion 84ª. A link 90 is pivotally connected with the other end of the lever 88 by a pivot pin 91. The lower portion of the link 90 is yoked to straddle the reduced or thin portion 37ª of the plate 11. A removable pin 92 is arranged through openings in the link 90 and the plate portion 37 to pivotally connect the link and the plate 11.

In the operation of the plate shifting means illustrated in Figs. 12, 13 and 14 of the drawings the handle 86 may be manually swung or operated to shift the plate 11. When the plate 11 is in the closed position illustrated in the drawings the handle 86 rests on the lower stop 87. To move the plate 11 to its open or inoperative position, the handle 86 is merely swung upwardly to engage against the upper stop 87. During this movement of the handle 86 the lever 88 swings to the position illustrated in the broken lines in Fig. 13 to bring the link 90 and the plate 11 to the positions indicated by the broken lines in that figure. The plate operating or moving means 12ª illustrated in Figs. 12, 13 and 14 is simple and inexpensive and is particularly useful in situations where the device is to be installed where there is restricted space for the operating parts.

Having described only tpical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve translatable on said part and having an end facing the seat, a packing unit movable on and sealing with said part and having an end engaging said end of the sleeve, a ring shiftable on said part and engaging the opposite end of said packing unit, a slack connection between the sleeve and ring, a packing unit on the ring opposing said seat, and manually operable means for moving said sleeve to cause the last named packing unit to seal with the seat when the plate is in the chamber and to seal with the plate when the same extends across the passage.

2. In a valve device of the character described, a body having a chamber and a fluid passage intersecting the chamber, an annular seat in the body surounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, and sealing means including two elements shiftable longitudinally on said part, means connecting the elements for limited relative longitudinal movement, a packing ring engaged between said elements operable to seal with the said part, and a picking ring on one of said elements adapted to seal with the seat when the plate is in the chamber and operable to seal with the plate when the same is across the passage, the first named packing ring being compressed between said elements when the second mentioned packing ring is forced against the seat and the plate.

3. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve translatable on said part, a ring slackly connected with the sleeve, packing compressible between the sleeve and ring to seal about said part, packing on the ring for sealing with the seat when the plate is in the chamber and for sealing with the plate when the same extends across the passage, and means for shifting the sleeve on said part and operable to compress the first mentioned packing and to force the second mentioned packing against the seat or the plate.

4. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve translatable on said part, a ring slackly connected with the sleeve, packing compressible between the sleeve and ring to seal about said part, packing on the ring for sealing with the seat when the plate is in the chamber and for sealing with the plate when the same extends across the passage, and means for shifting the sleeve and operable to compress the first mentioned packing and to force the second mentioned packing against the seat or the plate, the last mentioned means including a yoke pivoted in the chamber and having an opening passing the sleeve, shiftable connections between the yoke and sleeve, and manual means for pivoting the yoke to shift the sleeve.

5. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve shiftable on said part, a ring slackly connected with the sleeve, packing compressible between the sleeve and ring to seal about said part, packing on the ring for sealing with the seat when the plate is in the chamber and for sealing with the plate when the same extends across the passage, and means for shifting the sleeve and operable to compress the first mentioned packing and to force the second mentioned packing against the seat or the plate, the last mentioned means comprising a pivoted yoke in the chamber encircling the sleeve, a connection between the yoke and the sleeve, and a shaft connected with the yoke and extending from the body for manual operation.

6. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve shiftable on said part, a ring slackly connected with the sleeve, packing compressible between the sleeve and ring to seal about said part, packing on the ring for sealing with the seat when the plate is in the chamber and for sealing with the plate when the same extends across the passage, and means for shifting the sleeve and operable to compress the first mentioned packing and to force the second mentioned packing against the seat or the plate, the last mentioned means comprising a pivoted yoke in the chamber having an opening freely passing the sleeve, a connection between the yoke and the sleeve, a rotatable and axially shiftable operating shaft, and a ball and socket connection between the shaft and the yoke.

7. In a valve device of the character described, a body having a chamber and a fluid passage intersecting the chamber, an annular seat in the body surrounding the passage at one side of the chamber, a tubular part extending from the opposite side of the chamber toward said seat, the interior of said part forming a portion of said passage, a plate, means for moving the plate between a position in the chamber and a position between the seat and the said part where it extends across said passage, a sleeve translatable on said part, a ring slackly connected with the sleeve, packing compressible between the sleeve and ring to seal about said part, packing on the ring for sealing with the seat when the plate is in the chamber and for sealing with the plate when the same extends across the passage, and means for translating the sleeve on said part and operable to compress the first mentioned packing and to force the second mentioned packing against the seat or the plate, the last mentioned means including a yoke in the chamber encircling the sleeve, sliding connections between the yoke and sleeve, ball and socket means pivotally supporting the yoke, and manually operable means for pivoting the yoke.

LELAND S. HAMER.